(12) United States Patent
Safford et al.

(10) Patent No.: US 7,003,691 B2
(45) Date of Patent: *Feb. 21, 2006

(54) METHOD AND APPARATUS FOR SEEDING DIFFERENCES IN LOCK-STEPPED PROCESSORS

(75) Inventors: Kevin David Safford, Fort Collins, CO (US); Jeremy P. Petsinger, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 602 days.

This patent is subject to a terminal disclaimer.

(21) Appl. No.: 10/183,561

(22) Filed: Jun. 28, 2002

(65) Prior Publication Data

US 2004/0078651 A1  Apr. 22, 2004

(51) Int. Cl.
*G06F 11/00* (2006.01)
(52) U.S. Cl. .......................................... 714/11; 714/12
(58) Field of Classification Search ................. 714/30, 714/12, 11, 41
See application file for complete search history.

(56) References Cited

U.S. PATENT DOCUMENTS

| | | | | |
|---|---|---|---|---|
| 4,750,177 A | * | 6/1988 | Hendrie et al. | 714/748 |
| 4,849,979 A | * | 7/1989 | Maccianti et al. | 714/41 |
| 5,157,780 A | * | 10/1992 | Stewart et al. | 714/31 |
| 5,428,768 A | * | 6/1995 | Sugahara | 714/10 |
| 5,434,997 A | | 7/1995 | Landry et al. | |
| 6,065,135 A | | 5/2000 | Marshall et al. | |
| 6,249,856 B1 | * | 6/2001 | Garg et al. | 712/23 |
| 6,279,119 B1 | | 8/2001 | Bissett et al. | |

* cited by examiner

*Primary Examiner*—Robert Beausoliel
*Assistant Examiner*—Timothy M. Bonura

(57) ABSTRACT

An apparatus, and a corresponding method, are used for seeding differences in lock stepped processors, the apparatus implemented on two or more processors operating in a lock step mode, wherein each of the two or more processors comprise a processor-specific resource operable to seed the differences, a processor logic to execute a code sequence, wherein an identical code sequence is executed by the processor logic of each of the two or more processors, and an output to provide a result of execution of the code sequence. The processor outputs, based on execution of the code sequence is provided to a lock step logic operable to read and compare the output of each of the two or more processors.

13 Claims, 3 Drawing Sheets

METHOD AND APPARATUS FOR SEEDING DIFFERENCES IN LOCK-STEPPED PROCESSORS

TECHNICAL FIELD

The technical field is computer systems employing lock stepped processors.

BACKGROUND

Advanced computer architectures may employ multiple processors. Some advanced computer architectures may employ multiple microprocessors on one silicon chip. In a typical application, two microprocessors may be implemented on a single silicon chip, and the implementation may be referred to as a dual core processor. Two or more of the multiple microprocessors may operate in a lock step mode, meaning that each of the lock stepped microprocessors process the same code sequences, and should, therefore, produce identical outputs. FIG. 1A illustrates a typical implementation of a dual core processor. A dual core processor 10 includes a silicon chip 11 having microprocessor core 12 (core 0) and microprocessor core 14 (core 1). The microprocessor cores 12 and 14 are coupled to an interface logic 16 that monitors external communications from the microprocessor cores 12 and 14. In the dual core processor 10, the microprocessor cores 12 and 14 operate as independent entities. While the dual core processor 10 has advantages in terms of size and processing speed, the reliability of the dual core processor 10 is no better than that of two single core processors.

To enhance reliability, the dual core processor, or other multiple microprocessor architected computer systems, may employ lock step features. FIG. 1B is a diagram of a prior art dual core processor that uses lock step techniques to improve overall reliability. In FIG. 1B, a computer system 18 includes a dual core processor 20 having a single silicon chip 21, on which are implemented microprocessor core 22 and microprocessor core 24. To employ lock step, each of the microprocessor cores 22 and 24 process the same code streams. To ensure reliable operation of the dual core processor 20, each of the microprocessors 22 and 24 may operate in "lock step." An event that causes a loss of lock step can occur on either or both of the microprocessor cores 22 and 24. An example of such an event is a data cache error. A loss of lock step, if not promptly corrected, may cause the computer system 18 to "crash." That is, a failure of one microprocessor core may halt processing of the dual core processor 20, and the computer system 18, even if the other microprocessor core does not encounter an error.

To detect a loss of lock step, a lock step logic 26, which may be external to the chip 21, compares outputs from the microprocessor cores 22 and 24. An error in processing may be detected by the lock step logic 26 and indicates a loss of lock step.

To ensure timely and accurate identification of lock step errors, and to ensure proper execution of lock step functions, a system (or test) designer may desire to test the dual core processor 20. However, the system designer must first accurately induce a difference between the microprocessor cores 22 and 24, and then let the difference propagate through the microprocessor cores 22 and 24 to the lock step logic 26, where the lock step error can be detected.

SUMMARY

An advanced multi-core processor architecture, and corresponding method, are used to enhance reliability and to improve processing performance. In an embodiment, an apparatus, and a corresponding method, are used for seeding differences in lock stepped processors, the apparatus implemented on two or more processors operating in a lock step mode, wherein each of the two or more processors comprise a processor-specific resource operable to seed the differences, a processor logic to execute a code sequence, wherein an identical code sequence is executed by the processor logic of each of the two or more processors, and an output to provide a result of execution of the code sequence. The processor outputs, based on execution of the code sequence, are provided to a lock step logic operable to read and compare the output of each of the two or more processors.

DESCRIPTION OF THE DRAWINGS

The detailed description will refer to the following figures, in which like numbers refer to like elements, and in which.

DETAILED DESCRIPTION

An apparatus, and a corresponding method, for testing lock step functionality during a chip design process are disclosed. Lock step processors, by definition, run identical code streams, and produce identical outputs. Lock step logic incorporated in the processors, or otherwise associated with the processors, is used to detect a difference in outputs of the lock step processors. A difference in outputs (i.e., loss of lock step) is indicative of an error condition in at least one of the processors. Without direct access to the individual processors (by way of a test port, for example) a system designer will not be able to insert differences (e.g., error conditions) into one or more of the lock step processors to generate the loss of lock step for testing. To test various mechanisms of the lock step logic, the apparatus and method described herein may be used to seed differences in the processors.

Figure 1A:
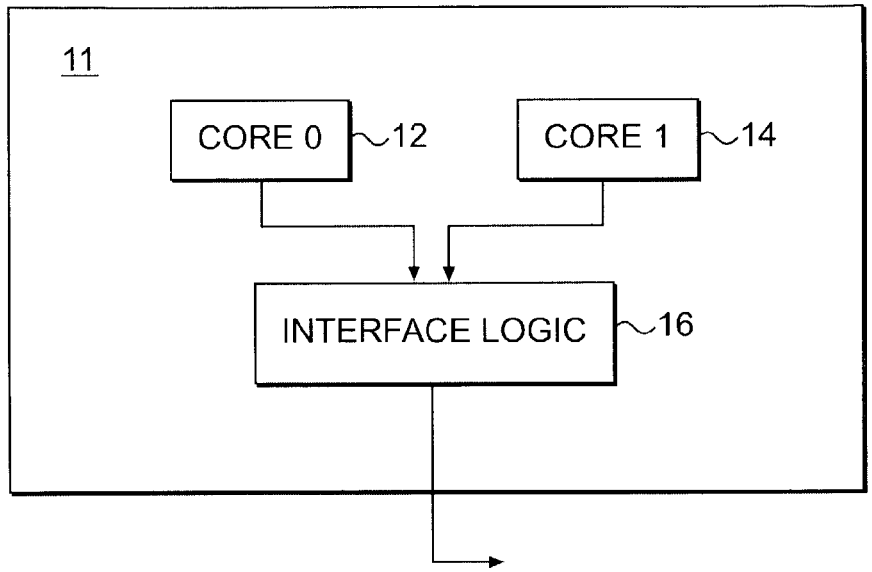
FIGS. 1A and 1B illustrate multi-processor computer systems.
Figure 1B:
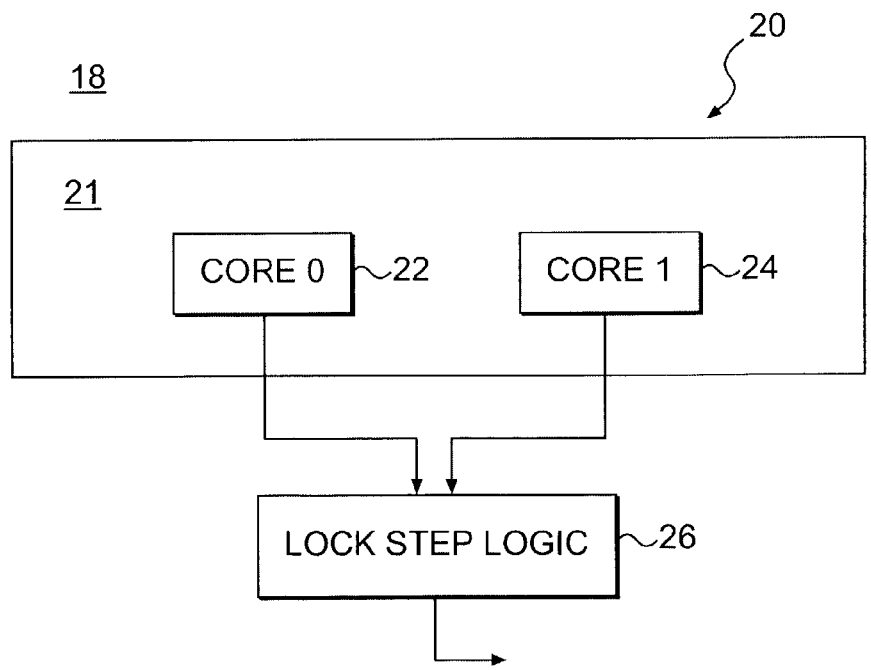
Figure 2:
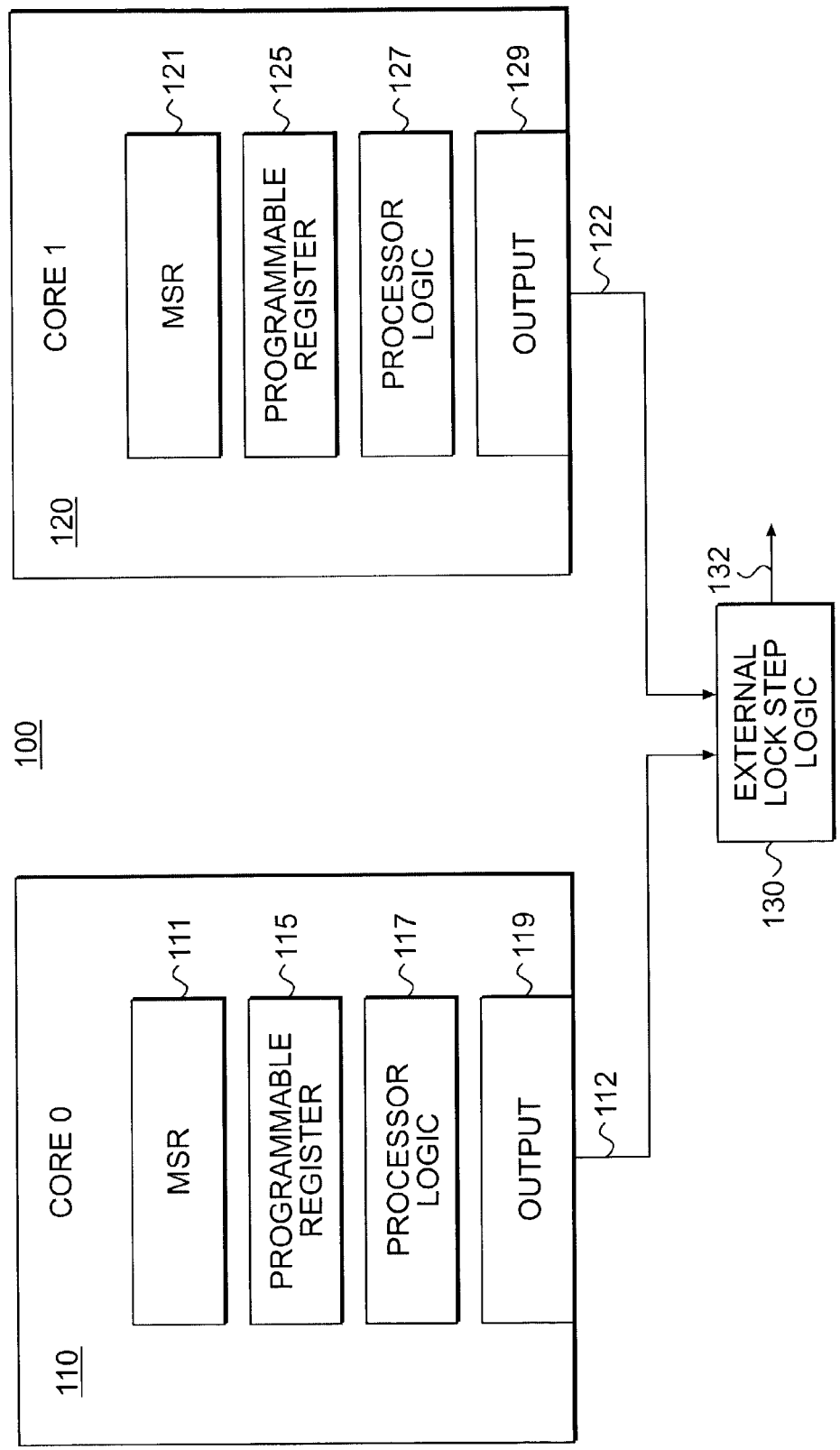
FIG. 2 is a diagram of an apparatus for seeding differences between two lock step processors.

FIG. 2 illustrates an embodiment of an apparatus for seeding differences to allow testing of lock step logic. In FIG. 2, a test system 100 includes processor 110 (designated as core 0) and processor 120 (designated as core 1). The processors 110 and 120 may be implemented on a single silicon chip (not shown). Alternatively, the processors 110 and 120 may be implemented on separate chips. Although FIG. 2 shows two processors 110 and 120, the apparatus and method described herein can be used to seed differences in any number of processors.

The processors 110 and 120 may include means for seeding differences. Such means may include a processor-unique resource. Examples of processor-unique resources are read-only machine-specific registers (MSRs) and programmable registers. Other mechanisms internal to the processors 110 and 120 may also be used to store information unique to a specific processor. In an embodiment, the processor 110 includes MSR 111, and the processor 120 includes MSR 121. The function of the MSRs 111 and 121 will be described later. Alternatively, or in addition, the processor 110 may include a programmable register 115, and the processor 120 may include a programmable register 125. The function of the programmable registers 115 and 125 will be described later. The processor 110 includes processor logic 117 to allow execution of code sequences, and an output 119 to provide the results of the execution to a device external to the processor 110. Similarly, the processor 120 includes processor logic 127 and an output 129.

Coupled to the processors 110 and 120 is external lock step logic 130. When the processors 110 and 120 are implemented on a single silicon chip, the external lock step logic 130 may also be implemented on the same silicon chip. The external lock step logic 130 compares outputs 112 and 122 from the processors 110 and 120, respectively, to determine if a loss of lock step (lock step error) has occurred, as would be indicated by a difference in the outputs 112 and 122. The external lock step logic 130 may then signal 132 the lock step error.

In an embodiment, the processors 110 and 120 are identical except that the processor 110 and the processor 120 have different address identifications (i.e., different core_ids). The core_ids may be stored in the respective MSRs 111 and 121 of the processors 110 and 120. The difference in core_ids may then be used to test loss of lock step functions. In particular, the test designer may prepare code sequences to run on the processors 110 and 120 such that the respective outputs 112 and 122 differ, with the difference generated, or seeded, based on the different core_ids. In the illustrated embodiment, when the processors 110 and 120 read the core_id value from their respective MSRs 111 and 121, a one bit difference is created between the processors 110 and 120. In other embodiments, other features of the processors 110 and 120 may be used to seed the differences. As long as the features include, or generate, at least a one bit difference between the processors 110 and 120, the code sequences executed by the processors 110 and 120 should produce different results. By carefully designing code sequences, the test designer can test various aspects of the lock step logic. For example, code sequences can be constructed to test the lock step logic based on errors in translation lookaside buffers (TLBs), cache, and other components of the processors 110 and 120.

Figure 3:
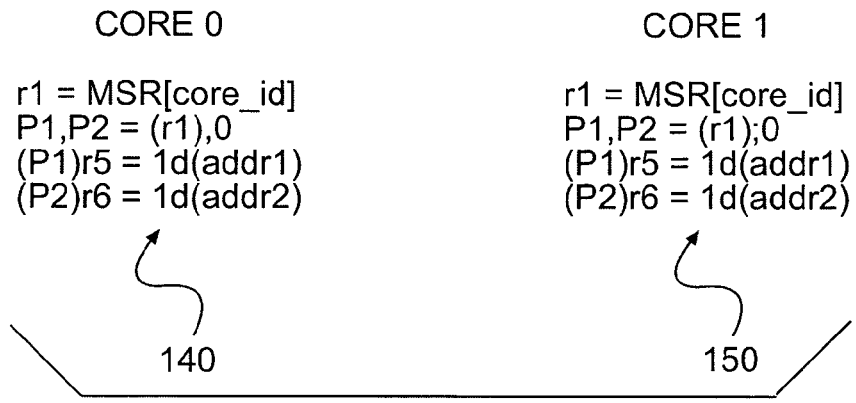
FIG. 3 illustrates a representative code sequences that may be used to generate a lock step error.

FIG. 3 is an example of a code sequence that can be used to test lock step logic. In FIG. 3, the processor 110 (core 0) runs code sequence 140, and the processor 120 (core 1) runs the code sequence 150. The code sequences 140 and 150 are identical. However, the processor ids (core_id) between the processors 110 and 120 are different. In the code sequences 140 and 150, the first step is to read the core_id in the MSRs 111 and 121. Next, predicate values P1 and P2 allow conditional execution of a load operation, with core 0 making a load based on address 1 and core 1 making a load based on address 2 where address 1 is not the same as address 2 and the data at those addresses are different. That is, the processor 110 reads address 1 and the processor 120 reads address 2. The step (P1)r5 is executed only when the value of P1 is 1, and the step (P2)r6 is executed only when the value of P2 is 1. Because the processor 110 reads its core_id in r1 as 0, the predicate value P1 is 1 (true) and the predicate value P2 is 0 (false). Accordingly, the processor 110 executes (P1)r5. In a similar fashion, the processor 120 executes (P2)r6. Then, a register r5 receives a load of address 1, and a register r6 receives a load of address 2.

Thus, the processor 110 executes the first load instruction ((P1)r5) and the processor 120 executes the second load instruction ((P2)r6).

Other mechanisms are also available for conditional execution, in addition to predicate values. For example, the processor 120 may execute a conditional branch instruction based on values stored in the register r5.

Careful selection of the code sequences also prevents early propagation of the lock step error to the external lock step logic 130. For example, a code sequence that is intended to seed a lock step error into a TLB may not actually seed the lock step error in the TLB if the value read from the MSRs 111 and 121 were to be written out to an external memory through the lock step logic 130. In this situation, the external lock step logic 130 would see the difference in outputs 112 and 122, and may signal a lock step error based on the data written out to memory, without the intended feature (the TLB) actually being tested.

As an alternative to using a read-only MSR as the unique processor resource with which to seed differences, the test designer may use a programmable feature, such as the programmable registers 115 and 125 in the processors 110 and 120, respectively, to seed differences. The programmable registers 115 and 125 may then be made to be read different values (i.e., the registers 115 and 125 may be hard-wired to different values).

Figure 4:
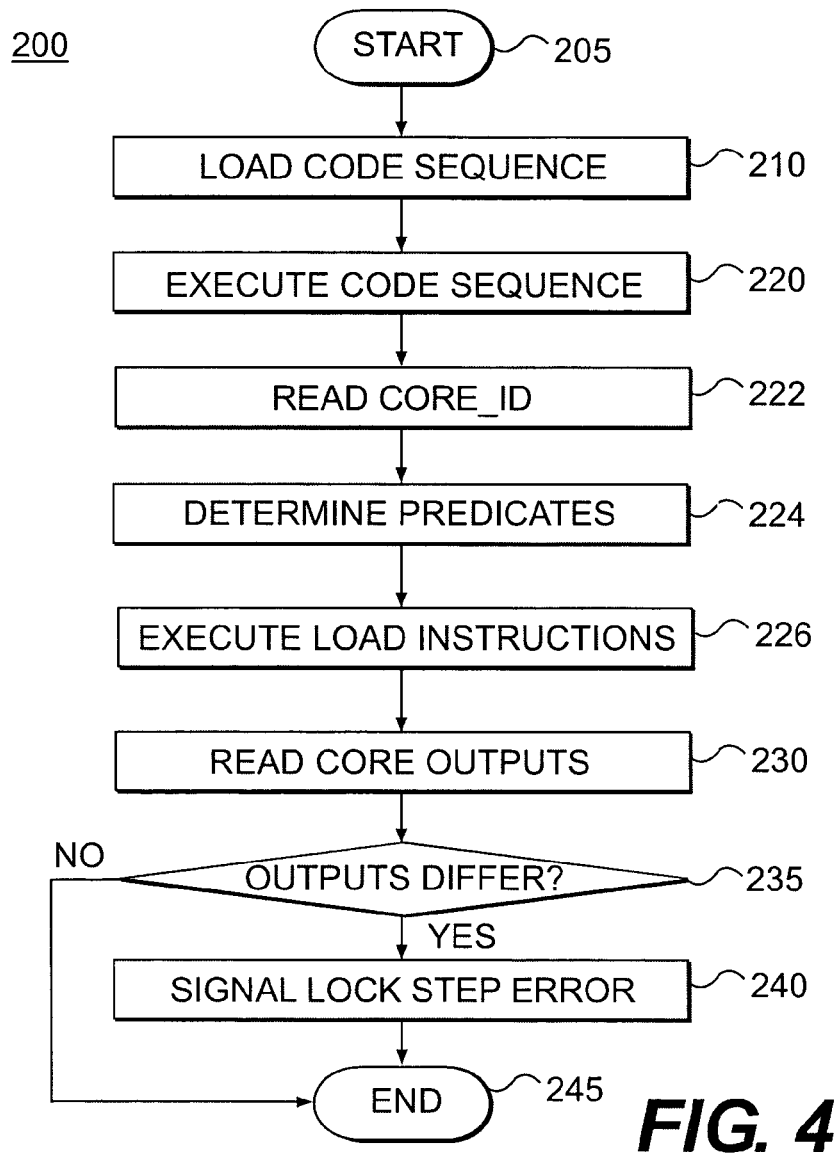
FIG. 4 is a flow chart of an operation of the apparatus of FIG. 2.

FIG. 4 is a flow chart illustrating a test operation 200 of the apparatus 100 of FIG. 2. The operation begins in block 205. In block 210, the test designer loads a code sequence to test the lock step functions of the processors 110 and 120. The code sequence may be designed to test several different components of the processors 110 and 120. That is, the code sequence may comprise several different sub-sequences. In block 220, the processors 110 and 120 both execute identical versions of a first code sub-sequence. Block 220 is first executed when the processors 110 and 120 read address information (core_id) contained within the MSRs 111 and 121, respectively, block 222. Next conditional of values are determined, block 224 and instructions are executed, block 226. For example, predicate values P1 and P2 are determined to be either 0 or 1, block 224. Then, load instructions are executed based on the predicate value, block 226.

In block 230, the seeded difference has propagated through the processors 110 and 120, and is read at the core outputs. In block 235, the external lock step logic 130 determines if a difference in outputs between the processors 110 and 120 exists. If no difference exists, the operation 200 moves to block 245, and either ends, or returns to block 220 to execute another code sub-sequence. If in block 235, a difference is detected, the external lock step logic signals a lock step error. The operation 200 then moves to block 245. Alternatively, the operation 200 may loop back to block 210 and additional testing may be conducted.

The terms and descriptions used herein are set forth by way of illustration only and are not meant as limitations. Those skilled in the art will recognize that many variations are possible within the spirit and scope of the invention as defined in the following claims, and there equivalents, in which all terms are to be understood in their broadest possible sense unless otherwise indicated.

What is claimed is:

1. An apparatus for seeding differences in lock stepped processors, comprising:
   two or more processors operating in a lock step mode,
      wherein each of the two or more processors comprise:
         read-only machine specific register (MSR) operable to seed the differences, processor logic to execute a code sequence, wherein an identical code sequence is executed by the processor logic of each of the two or more processors, and an output to provide a result of execution of the code sequence; and a lock step logic operable to read and compare the output of each of the two or more processors.

2. The apparatus of claim 1, wherein the MSR comprises a unique core identification.

3. The apparatus of claim 2, wherein execution of the code sequence causes the unique core identification to be read from the MSR.

4. The apparatus of claim 1, wherein the differences are seeded in one of a translation lookaside buffer, a register, a cache, an internal processor memory, and other internal processor structures.

5. A method for seeding differences in lock stepped processors, comprising:
   loading a code sequence; and
   in each of two or more processors operating in lock step, executing the code sequence, comprising:
      reading a read-only machine specific register (MSR), determining a conditional state, and
      executing an instruction based on the conditional state.

6. The method of claim 5, further comprising:
   reading an output of each of the two or more processors;
   comparing the read outputs; and
   if the read outputs differ, signaling a loss of lock step error.

7. The method of claim 5, wherein the MSR comprises a unique core identification.

8. The method of claim 7, wherein reading the MSR comprises reading the unique core identification.

9. The method of claim 5, wherein the differences are seeded in one of a translation lookaside buffer, a register, a cache, an internal processor memory and other internal processor structures.

10. The method of claim 5, wherein the conditional state is determined by two or more predicate values.

11. A method for seeding differences in lock stepped processors, comprising:
   identifying a first lock stepped processor based on a value unique to the first lock-stepped processor;
   executing a first instruction based on the identifying step, comprising reading a read-only machine specific register (MSR), whereby a first output is created; and
   comparing the first output to one or more subsequent outputs generated by execution of subsequent instructions on subsequent lock stepped processors, wherein if any of the first and the subsequent outputs differ, a loss of lock step is indicated.

12. The method of claim 11, wherein the value unique to the first lock stepped processor is an address of the first lock stepped processor.

13. The method of claim 11, wherein the value unique to the first lock stepped processor is a value hard wired to the first lock stepped processor.

\* \* \* \* \*